Patented Sept. 21, 1948

2,449,644

UNITED STATES PATENT OFFICE 2,449,644

PRODUCTION OF N.N DIBUTYL PHENETHYLAMINE

Joseph D. Danforth, Riverside, Ill., assignor to Universal Oil Products Company, Chicago, Ill., a corporation of Delaware No Drawing. Application October 19, 1944, Serial No. 559,476

1 Claim. (Cl. 260—577)

This invention relates to the condensation of an aryl alkene with an amine selected from the group consisting of primary and secondary amines. The resultant aromatic amines are useful in the preparation of medicinals, drugs, insecticides, etc.

An object of this invention is the condensation of an aryl alkene having a vinyl group and a non-tertiary amine in the presence of a catalyst selected from the group consisting of an alkali metal and the reaction product of an alkali metal and a non-tertiary amine.

An additional object of this invention is the production of an aryl alkyl amine by condensing in the presence of an alkali metal an aryl alkene having a vinyl group and an amine having a hydrogen atom combined chemically with nitrogen.

A further object of this invention is the production of an aryl alkyl amine by condensing in the presence of an alkali metal catalyst an aryl alkene having a vinyl group and an amine having in chemical combination with its nitrogen atom a replaceable hydrogen atom.

One specific embodiment of the present invention relates to a process for producing an aralkyl alkyl amine which comprises condensing a vinyl aromatic hydrocarbon and a non-tertiary amine in the presence of a catalyst selected from the group consisting of an alkali metal and an alkali metal amine.

A further embodiment of the present invention comprises a process for condensing an amine having an active hydrogen atom with styrene in the presence of a catalyst selected from the group consisting of an alkali metal and an alkali metal amine.

A still further embodiment of this invention relates to a process which comprises condensing styrene and a primary amine in the presence of a catalyst selected from the group consisting of an alkali metal and an alkali metal amine.

I have found that alkali metals and the reaction products of alkali metals with primary and secondary amines are active catalysts for effecting the condensation of vinyl aromatic hydrocarbons with amines containing an active hydrogen atom in chemical combination with the nitrogen of said amine. Such catalysts include particularly lithium, sodium, and potassium, and the reaction products of these metals with a primary or secondary amine. The alkali metal amine catalysts include such materials as the anilides of lithium, sodium, and potassium; the sodium compound of a dialkyl amine as of di-sec-butyl amine, dimethyl amine, etc., and an alkali metal compound of a primary aliphatic amine such as monomethyl amine, monobutyl amine, etc.

Amines utilizable as starting materials in the process of this invention contain an active hydrogen atom combined chemically with nitrogen and thus include both primary and secondary amines.

These active amines may also be referred to as non-tertiary amines and are respresentable by the formula:

in which R is a hydrogen atom or an alkyl, alkenyl, aralkyl, or aryl group, and R' is an alkyl, alkenyl, aryl, or aralkyl group. Although not represented by the general formula above indicated, polyalkylene-polyamines, such as diethylenetriamine, which contain replaceable hydrogen atoms in chemical combination with nitrogen may also be utilized in my process.

Aryl alkenes and substituted aryl alkenes which are condensible with non-tertiary amines as herein set forth contain a vinyl group and may be represented by the general formula:

$$Ar-C=C-R'$$
$$\quad\;\; | \;\; |$$
$$\quad\;\; R \; H$$

in which Ar represents an aryl group such as a phenyl, alkyl phenyl, halo-phenyl, or another aromatic, alkyl aromatic, or substituted aromatic group; and R and R' represent hydrogen atoms, alkyl, naphthyl, or aryl groups. An essential feature of these aryl alkenes is that they have a side chain containing a double bond in conjugated relationship with a double bond of the aromatic nucleus. Styrene with the formula

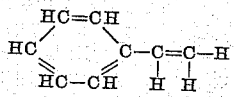

is illustrative of the vinyl aromatic compounds which are condensible with non-tertiary amines as herein set forth.

According to the process of my invention, primary amines react with vinyl aromatic compounds to produce secondary and tertiary amines containing, respectively, one and two aromatic groups. Secondary amines react similarly to form tertiary amines containing an aromatic group. Thus, styrene and dibutyl amine are condensed in the presence of metallic sodium to produce phenylethyl dibutyl amine.

As already mentioned herein, catalysts utilizable in my process comprise alkali metals and alkali metal amines. The alkali metals are used preferably in the form of thin shavings or relatively small particles, the latter being often of spherical shape and so formed by dispersing the molten metal in a substantially inert fluid such as a heavy mineral oil. It is sometimes advantageous to use alkali metal amines instead of alkali metals as catalysts for the condensation of an aryl alkene with a primary or secondary amine.

An alkali metal amine which may also be referred to as the reaction product of an alkali metal with a non-tertiary amine may be prepared by the following procedure. When an alkali metal amine is prepared, for example from sodium, this metal is added to a molecular excess of the amine and the reaction mixture is then brought to a temperature of between 100° and about 130° C. After the sodium has become molten, the reaction mixture is stirred vigorously and gaseous butadiene is bubbled slowly into the reaction mixture.

Reaction occurs and the alkali metal amine is formed according to the following equation which illustrates the formation of a sodium dialkyl amine from a secondary amine starting material:

$$2R_2NH + 2Na + C_4H_6 \rightarrow C_4H_8 + 2R_2NNa$$

The products of this reaction containing the sodium amine in admixture with the excess of the non-tertiary amine charged to the process is used directly as catalyst for the condensation of a vinyl aromatic compound with a non-tertiary amine, or the solution is cooled and the excess of unconverted non-tertiary amine is decanted from the solid alkali metal amine. The recovered alkali metal amine, in this instance the sodium amine, is then added as catalyst for any of the above mentioned condensation reactions of non-tertiary amines and aryl alkenes containing a vinyl group. However, in order to avoid contamination of the reaction products, the catalyst employed in most cases is a sodium or potassium derivative of the particular amine which is to be reacted with the aryl alkene.

In an alternative preparation of the catalyst in situ, the alkali metal is mixed with the amine, the temperature of the mixture is increased above the melting point of the alkali metal, and then stirring is started. When the alkali metal is thoroughly dispersed in the amine, for example, as by means of a turbomixer, a relatively small charge of a diolefin as butadiene (approximately 1 mol per mol of alkali metal present) is added slowly to the mixture. The reaction shown in the above equation occurs, forming the alkali metal amine in situ after which the temperature of the reaction mixture is generally lowered and the aryl alkene containing a vinyl group is added to bring about the desired condensation to form a secondary or tertiary aryl alkyl amine. When the catalyst is prepared separately before use, the heating and subsequent cooling of the amine before adding the aryl alkene is unnecessary.

The condensation of an amine having an active hydrogen atom combined chemically with its nitrogen atom and an aryl alkene having a vinyl group is carried out preferably at a temperature of from about 0° to about 150° C. and at a pressure sufficient to keep the reaction mixture in substantially liquid phase. In general, the time of reaction and operating conditions needed to effect the desired condensation is dependent upon the nature of the catalyst and of the aryl alkene and primary or secondary amine charged. When reacting primary and secondary aliphatic amines, it is generally necessary to cool the reaction mixture in order to remove the exothermic heat of reaction at a sufficient rate to control the reaction temperature.

The following example is given to illustrate my process, although it is not intended that these experimental data should unduly limit the broad scope of my invention.

115 parts by weight of styrene, 129 parts by weight of dibutyl amine, and 5 parts by weight of metallic sodium ribbon were contacted at about 50° C. for 50 hours in a glass reactor. The reaction product was subjected to vacuum distillation to remove unconverted dibutyl amines and styrene. After recovery of the unconverted dibutyl amine and styrene, a 21% yield was obtained of a liquid product boiling at 150° C. at a pressure of 2 mm. of mercury and having a density of 0.8514 at 25° C. and a refractive index, $n_D^{20}$, of 1.4819. Analysis of this material for carbon, hydrogen, and nitrogen showed 82.4% carbon, 6.4% nitrogen, and 11.0% hydrogen. These analytical results correspond closely to the theoretical analysis of phenylethyl dibutyl amine containing 82.5% carbon, 6% nitrogen, and 11.5% hydrogen.

The nature of the present invention and type of results obtained are evident from the preceding specification and example, although neither section should be construed to limit unduly the broad scope of the invention.

I claim as my invention:

A process for the production of an aryl alkyl amine which comprises reacting styrene with dibutylamine at a temperature of from about 0° C. to about 150° C. in the presence of a catalyst comprising essentially the reaction product of metallic sodium with dibutylamine.

JOSEPH D. DANFORTH.

REFERENCES CITED

The following references are of record in the file of this patent:

UNITED STATES PATENTS

| Number | Name | Date |
| --- | --- | --- |
| 2,115,884 | Schollkopf | May 3, 1938 |

FOREIGN PATENTS

| Number | Country | Date |
| --- | --- | --- |
| 313,934 | Great Britain | 1929 |
| 319,205 | Great Britain | Oct. 9, 1930 |
| 496,280 | Germany | Apr. 15, 1930 |
| 528,466 | Germany | July 1, 1931 |

OTHER REFERENCES

Hickenbottom, Jour. Chem. Soc. 1934, pp. 319–323.